United States Patent
Kubo

(10) Patent No.: US 7,806,218 B2
(45) Date of Patent: Oct. 5, 2010

(54) RUNNING VEHICLE AND RUNNING VEHICLE SYSTEM, AND METHOD FOR DRIVING RUNNING VEHICLE

(75) Inventor: Hideki Kubo, Kyoto (JP)

(73) Assignee: Murata Machinery, Ltd., Kyoto-shi (JP)

( * ) Notice: Subject to any disclaimer, the term of this patent is extended or adjusted under 35 U.S.C. 154(b) by 353 days.

(21) Appl. No.: 11/949,479

(22) Filed: Dec. 3, 2007

(65) Prior Publication Data

US 2008/0128191 A1 Jun. 5, 2008

(30) Foreign Application Priority Data

Dec. 1, 2006 (JP) .............................. 2006-325714

(51) Int. Cl.
  B60K 17/34 (2006.01)
  B60K 28/16 (2006.01)
  G06F 7/04 (2006.01)
  G05D 1/00 (2006.01)

(52) U.S. Cl. .................. 180/233; 180/197; 701/69; 701/82

(58) Field of Classification Search ............... 180/233, 180/242, 197, 6.48; 701/69, 82
  See application file for complete search history.

(56) References Cited

U.S. PATENT DOCUMENTS

| | | | | |
|---|---|---|---|---|
| 4,970,650 | A * | 11/1990 | Hashiguchi et al. ............ 701/83 |
| 5,002,147 | A * | 3/1991 | Tezuka et al. ................ 180/197 |
| 5,163,530 | A * | 11/1992 | Nakamura et al. ........... 180/197 |
| 5,346,032 | A * | 9/1994 | Sasaki ......................... 180/233 |
| 5,631,829 | A * | 5/1997 | Takasaki et al. ................ 701/69 |
| 5,765,657 | A * | 6/1998 | Fukumura et al. ............ 180/197 |
| 5,938,707 | A * | 8/1999 | Uehara ........................ 701/41 |
| 5,947,224 | A * | 9/1999 | Kouno ........................ 180/248 |
| 5,961,559 | A * | 10/1999 | Shimbara et al. ............. 701/23 |
| 6,064,301 | A * | 5/2000 | Takahashi et al. ........... 340/435 |
| 6,813,370 | B1 * | 11/2004 | Arai ........................... 382/104 |
| 6,909,959 | B2 * | 6/2005 | Hallowell .................... 701/88 |
| 7,529,604 | B2 * | 5/2009 | Moriguchi .................... 701/23 |
| 2003/0192729 | A1 * | 10/2003 | Sakakiyama ................ 180/233 |
| 2004/0074685 | A1 * | 4/2004 | Tham ......................... 180/168 |

FOREIGN PATENT DOCUMENTS

| | | | |
|---|---|---|---|
| JP | 01-247222 A | | 10/1989 |
| JP | 05-178114 A | | 7/1993 |
| JP | 2001-88684 A | | 4/2001 |
| JP | 2005-41383 A | | 2/2005 |
| JP | 2005-056382 A | | 3/2005 |
| JP | 2007219960 A | * | 8/2007 |
| JP | 2008222424 A | * | 9/2008 |

OTHER PUBLICATIONS

Japanese Office Action dated Jun. 26, 2008, issued in corresponding Japanese Patent Application No. 2006-325714.

* cited by examiner

Primary Examiner—Anne Marie M Boehler
Assistant Examiner—Daniel Yeagley
(74) Attorney, Agent, or Firm—Westerman, Hattori, Daniels & Adrian, LLP

(57) ABSTRACT

A running vehicle has front and rear driving wheels, and a sensor for measuring the acceleration of the running vehicle. The vehicle determines a distribution rate of torque to each of the driving wheels in accordance with the found acceleration, and changes driving torque to each of the front and rear driving wheels based on the found distribution rate to control driving motors.

3 Claims, 4 Drawing Sheets

RUNNING VEHICLE AND RUNNING VEHICLE SYSTEM, AND METHOD FOR DRIVING RUNNING VEHICLE

BACKGROUND OF THE INVENTION

1. Field of the Invention

The present invention relates to reducing slip of a running vehicle.

2. Description of the Related Art

In a running vehicle having a plurality of front and rear driving wheels, optimizing torque distribution to the front and rear driving wheels can bring about reduction in slip and running at higher acceleration and deceleration. In this respect, Japanese Laid-Open Patent Publication No. 2005-41383 discloses that a distribution rate of torque to front wheels and rear wheels is changed between acceleration and deceleration, and that slip is detected from a ratio of the numbers of rotations in the front wheels/rear wheels to change the torque distribution. However, in Japanese Laid-Open Patent Publication No. 2005-41383, the torque distribution is changed in accordance with whether it is at acceleration or deceleration, and actual acceleration is not used for torque control. This results in a limit to optimization of the torque distribution.

SUMMARY OF THE INVENTION

An Object of the present invention is to realize reduction in slip of a running vehicle and running at high acceleration and deceleration by optimizing torque distribution to a plurality of driving wheels.

An additional object of the present invention is to apply feedback control so as to eliminate the slip of the driving wheels.

Another additional object of the present invention is to provide a system that can optimize the torque distribution to the plurality of driving wheels of the running vehicle, perform the feedback control so as to eliminate the slip of the driving wheels, and detect an absolute position of the running vehicle as a basis of slip detection precisely and quickly.

According to the present invention, there is provided a running vehicle having front and rear driving wheels, and adapted to change torque distribution to the front and rear driving wheels in accordance with acceleration, the running vehicle including:

a sensor for measuring the acceleration of the running vehicle;

means for determining a distribution rate of torque to each of the front and rear driving wheels in accordance with the found acceleration; and means for changing driving torque to each of the front and rear driving wheels based on the found distribution rate to control driving motors.

Preferably, the running vehicle includes:

means for detecting an absolute position of the running vehicle;

means for detecting a rotation amount of each of the front and rear driving wheels;

means for comparing change in the absolute position per time and the rotation amount per time of each of the front and rear driving wheels to find presence or absence of slip for each of the front and rear driving wheels; and means for correcting the found driving torque so as to eliminate the slip.

According to the present invention, there is also provided a running vehicle system comprising:

a running vehicle having front and rear driving wheels; and marks arranged at intervals in at least two rows along a moving pathway of the running vehicle, the running vehicle including: a sensor for measuring acceleration of the running vehicle;

means for determining a distribution rate of torque to each of the front and rear driving wheels in accordance with the found acceleration;

means for changing driving torque to each of the front and rear driving wheels based on the found distribution rate;

at least two linear sensors for detecting the marks in at least two rows;

means for detecting an absolute position of the running vehicle from signals of the at least two linear sensors;

means for detecting a rotation amount of each of the front and rear driving wheels;

means for comparing change in the absolute position per time and the rotation amount per time of each of the front and rear driving wheels to find presence or absence of slip for each of the driving wheels; and means for correcting the found driving torque so as to eliminate the slip.

Moreover, according to the present invention, there is provided a method for driving a running vehicle having front and rear driving wheels, the method including the steps of:

measuring acceleration of the running vehicle by a sensor;

determining a distribution rate of torque to each of the front and rear driving wheels in accordance with the found acceleration; and changing driving torque to each of the front and rear driving wheels based on the found distribution rate to control driving motors.

In this specification, description of the running vehicle is true in the running vehicle system and the control method of the running vehicle.

In the running vehicle and the running vehicle system according to the present invention, actual acceleration during running is measured by an acceleration sensor, thereby enabling the torque distribution to be optimized.

Moreover, by comparing the change in the absolute position of the running vehicle per time with the rotation amount per time of each of the front and rear driving wheels, presence or absence of slip is found for each of the front and rear driving wheels, and the driving torque can be corrected so as to eliminate the slip.

Furthermore, since the torque distribution rate is not changed but the driving torque is changed against the slip, a case where the slip occurs simultaneously in each of the front and rear driving wheels can be addressed.

In the running vehicle system according to the present invention, since the absolute position is detected by the linear sensors continuously and precisely with high responsiveness, the slip can be measured precisely.

DESCRIPTION OF THE NUMERALS

Figure 1:
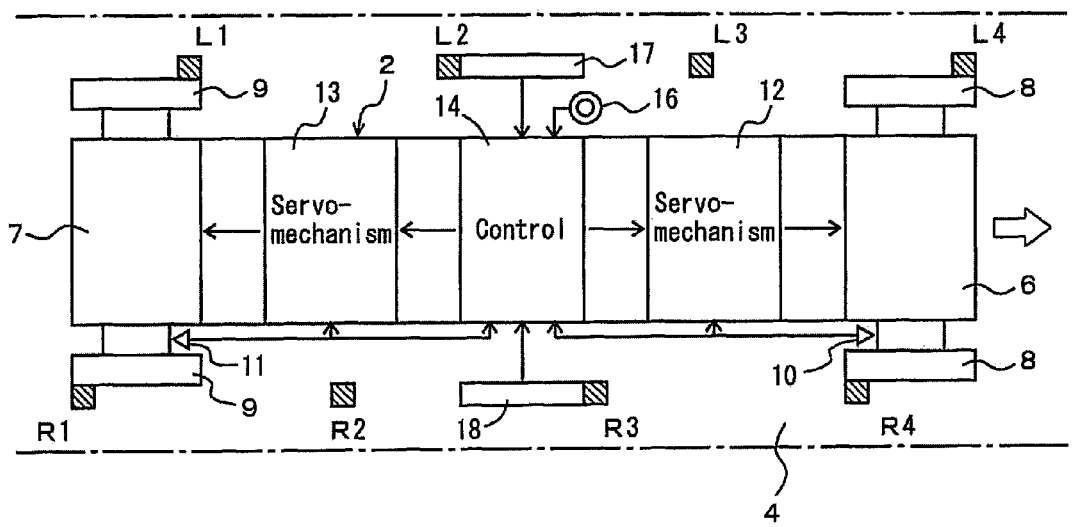
FIG. 1 is a block diagram of a running vehicle according to an embodiment.

2 running vehicle
4 running pathway
6,7 running motors
8,9 driving wheels
10,11 encoder
12,13 servomechanisms
14 controller
16 acceleration sensor
17,18 linear sensors
20 sensor interface
21 velocity pattern generator
22 torque distributor
23 slip detector
30 AC power source
31 coil
32,33 arithmetic unit
50 absolute position calculating unit
51 offset table
52 tracking table
53 adding unit
54 mark switcher
61 torque distribution table
62 arithmetic unit
71,72 subtractors
73,74 processors
R1~R4, L1~L4 magnetic marks

DESCRIPTION OF THE PREFERRED EMBODIMENT

FIGS. 1 to 7 show a running vehicle system according to an embodiment. In each of the drawings, reference numeral 2 denotes a running vehicle, which may be a stacker crane, a vehicle running in a rail guided or non-rail guided manner on the ground, an overhead traveling vehicle or the like. Reference numeral 4 denotes a running pathway, along which the running vehicle 2 circulates or reciprocates. The running vehicle 2 includes, for example, a pair of front and rear running motors 6 and 7. Reference numerals 8 and 9 denote front and rear driving wheels, and the front driving wheels 8 are referred to as front wheels, and the rear driving wheels 9 as rear wheels. Each of the driving wheels 8 and 9 consists of one or two wheels on the right and left, respectively, and the term "driving wheels" denotes a plurality of wheels driven by the same driving shaft without distinguishing between right and left.

Reference numerals 10 and 11 denote encoders, which detect rotation angles of the driving wheels 8 and 9, respectively, and feed back the outputs (encoder values) of the encoders 10 and 11 to servomechanisms 12 and 13 so as to control the running motors 6 and 7. Reference numeral 14 denotes a controller, which controls the servomechanisms 12 and 13. Reference numeral 16 denotes an acceleration sensor, which, for example, detects deflection of a diaphragm by acceleration to detect the acceleration of the running vehicle 2. Reference numerals 17 and 18 denote linear sensors. The running vehicle 2 is provided with at least two linear sensors 17 and 18, which are located on the right and left sides of the running vehicle 2 in this case. Magnetic marks R1 to R4, L1 to L4 and the like are provided along the running pathway 4, and the magnetic marks L1 to L4 and the like are detected by the linear sensor 17, and the magnetic marks R1 to R4 and the like are detected by the linear sensor 18. Sensor signals (linear sensor values) of the linear sensors 17 and 18 are processed by the controller 14 to detect an absolute position of the running vehicle 2. The absolute position is indicated, for example, by absolute coordinates with respect to a predetermined running origin.

Figure 2:
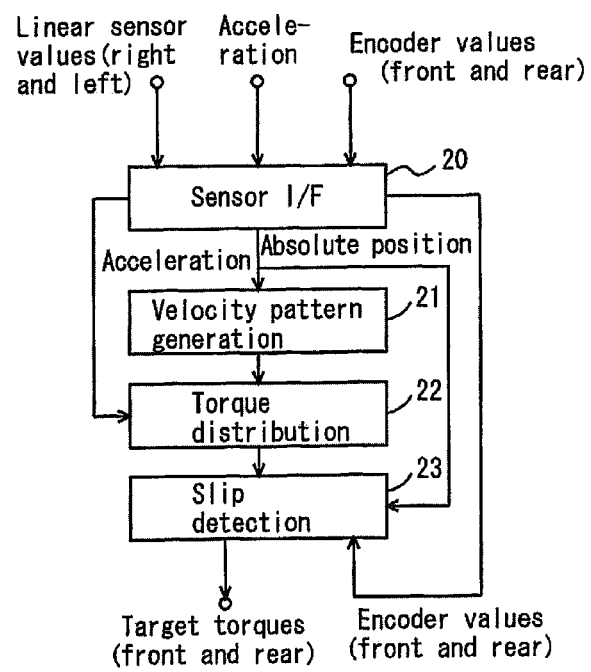
FIG. 2 is a block diagram of a controller in the running vehicle in the embodiment.

Referring to FIG. 2 showing a configuration of the controller 14, reference numeral 20 denotes a sensor interface, to which the linear sensor values from the right and left linear sensors, the acceleration from the acceleration sensor, and the encoder values from the front and rear encoders are inputted. The sensor interface 20 detects the absolute position using the sensor values of the right and left linear sensors, and outputs a change amount per predetermined time, for example, a difference in the absolute position. The sensor interface 20 finds a total number of rotations of each of the driving wheels 8 and 9 from the encoder values, a difference in total number of rotations between the previous time and this time, in other words, the number of rotations per time and the like.

For example, the absolute position is inputted to a velocity pattern generator 21 from the sensor interface 20, and the velocity pattern generator 21 finds a remaining travel distance and a velocity to a destination based on the absolute position to generate a running velocity pattern. The acceleration is inputted to a torque distributor 22 from the sensor interface 20 to determine distribution rates of the torque to the front and rear driving wheels 8 and 9 in accordance with the acceleration. To a slip detector 23 are inputted a difference in the absolute position and differences in the front and rear encoder values, in accordance with which, presence or absence of the slip and an extent thereof in each of the front and rear driving wheels 8 and 9 are detected to correct the torque for each of the driving wheels 8 and 9. Thereby, target torque is obtained for each of the driving wheels 8 and 9 to be inputted to each of the servomechanisms 12 and 13 to run the running vehicle 12.

Figure 3:
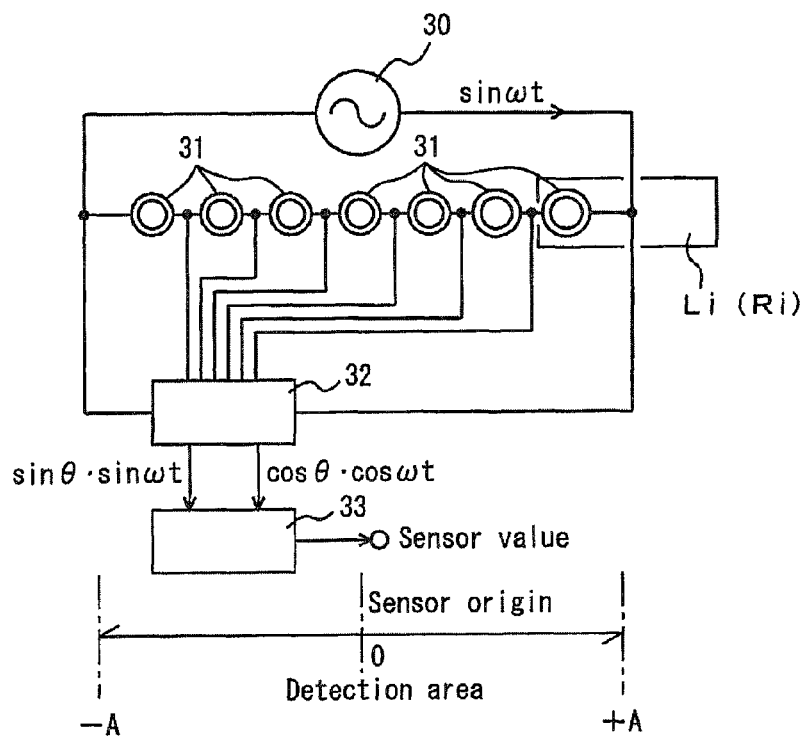
FIG. 3 is a block diagram of a linear sensor according to the embodiment.

A configuration of the linear sensor 17 (18) is shown in FIG. 3. Reference numeral 30 denotes an AC power source, an alternating current with a phase of $\sin \omega t$ is applied to a plurality of coils 31, and a voltage of each of the coils 31 is inputted to an arithmetic unit 32. An inductance of each of the coils 31 varies depending on a relative position with respect to the magnetic mark Li (Ri), and thus, when a phase with respect to a detection area (−A to +A) fixed by an arrayed range of the coils 31 is defined as $\theta$, $\cos\theta \cdot \cos\omega t$ and $\sin\theta \cdot \sin\omega t$ can be found in the arithmetic unit 32, where a range of $\theta$ is $-\pi$ to $+\pi$. Based on the output of the arithmetic unit 32, an arithmetic unit 33 outputs a sensor value in which, with a midpoint of the detection area defined as a sensor origin, the linear sensor value becomes $\theta$ at the sensor origin and has the range of −A to +A. While in this case, magnets are used as the magnetic marks R1 to R4 and L1 to L4, any appropriate magnetic materials may be used. The linear sensors each for detecting the phase with respect to the magnetic mark may be replaced with linear sensors each for detecting a phase with respect to an optical mark. Furthermore, although the linear sensors 17 and 18 may be each replaced with an absolute position sensor such as a laser range finder, a resolution of the laser range finder is lower than the resolution of the linear sensors 17 and 18 (about 10 to 100 μm), and time required for detecting the position is longer.

Figure 4:
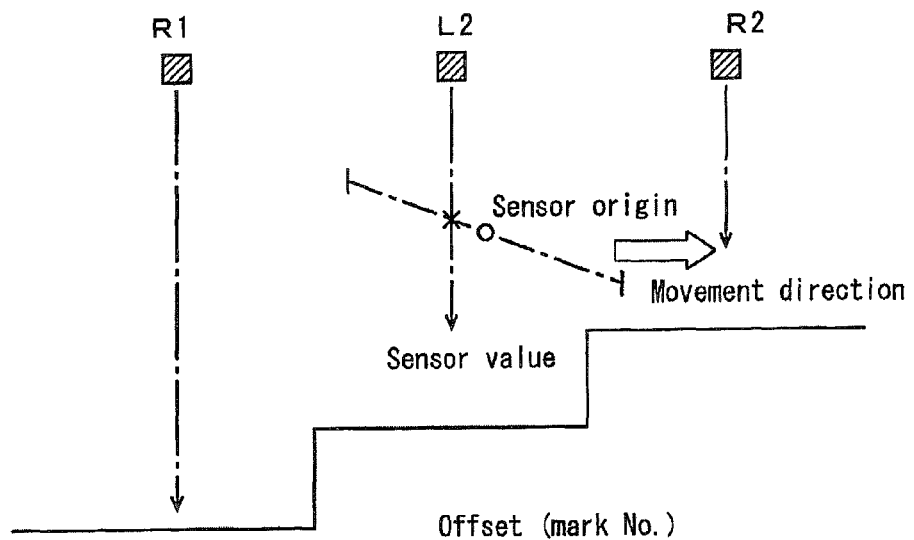
FIG. 4 is a diagram showing a conversion method from a linear sensor value to an absolute position in the embodiment.

FIG. 4 shows a conversion method from the linear sensor value to the absolute position. Assuming that the linear sensor detects the magnetic mark L2, the sensor value of the linear sensor becomes 0 when the magnetic mark L2 exists at the center of the detection area of the linear sensor, and the sensor value indicates displacement from the center of the detection area. When the number of the magnetic mark being detected currently is known and the absolute position (offset) with the linear sensor value being 0 is found in advance, a current absolute position can be found by adding the sensor value to the above-described absolute position. Since the number of the magnetic marks is known and the movement direction of the running vehicle is known on start-up of the running vehicle, the number of a new magnetic mark will be stored each time the magnetic mark is switched. This allows the number of the magnetic mark being detected to be found at any time during running.

Figure 5:
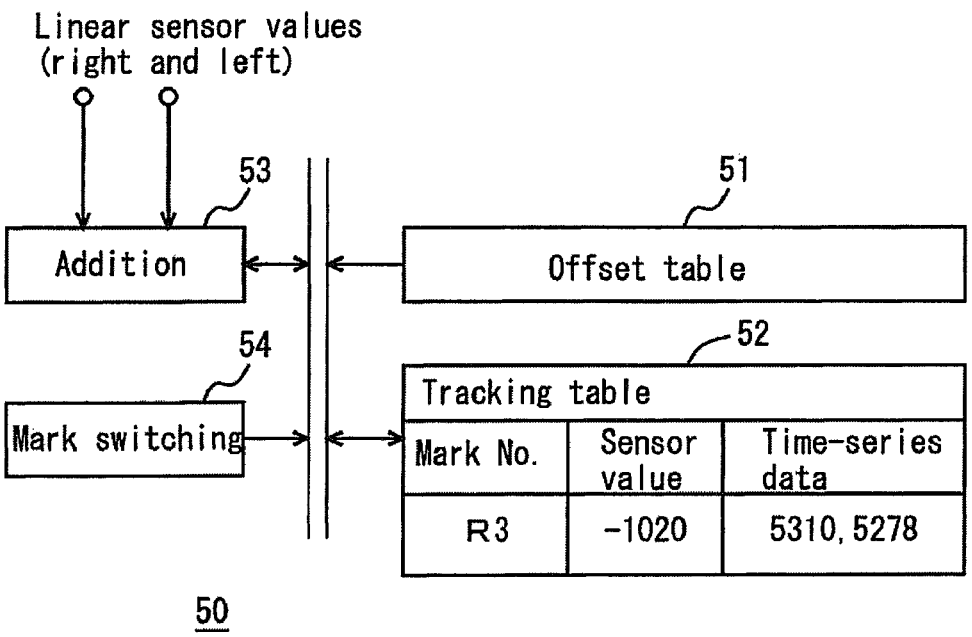
FIG. 5 is a block diagram showing an absolute position calculating unit using the linear sensor values in the embodiment.

FIG. 5 shows an absolute position calculating unit 50. The absolute position calculating unit 50 is a part of the sensor interface 20, in which the numbers of the magnetic marks and the offsets are described in an offset table 51. Furthermore, in a tracking table 52, the number of the magnetic mark being recognized currently and the sensor value regarding this magnetic mark, and time-series data of the absolute position are stored. An adding unit 53 has the sensor values from the right and left linear sensors inputted, and adds the same to the offset read from the offset table 51 to update the sensor values and the time-series data. A mark switcher 54 updates the number of the mark in the tracking table each time the magnetic mark is switched. The two-row magnetic marks R1 to R4 and L1 to L4 are arranged so that end portions of the detection areas of the right and left linear sensors overlap with each other, and for example, when switching is performed from the magnetic mark L2 to the magnetic mark R2 in FIG. 4, there is an area where the magnetic mark L2 and the magnetic mark R2 are detected simultaneously. This allows the absolute position to be detected without intermittence. When both the magnetic marks L2 and R2 are detected together by the pair of right and left linear sensors, the magnetic marks are switched.

Figure 6:
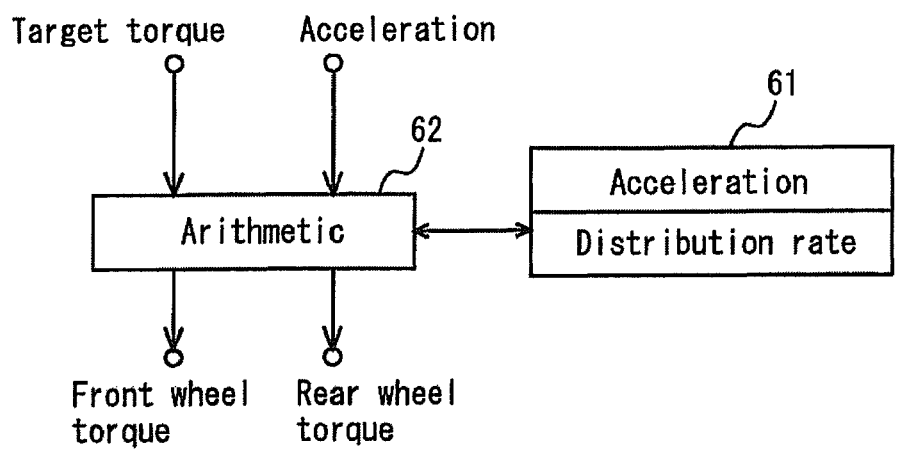
FIG. 6 is a block diagram of a torque distributor in the embodiment.

FIG. 6 shows a configuration of the torque distributor 22. In a torque distribution table 61, a distribution rate of torque with respect to the acceleration of the running vehicle is described. The acceleration has a positive or negative value, and as for the distribution rate, although a distribution rate to the front wheels and a distribution rate to the rear wheels may be described respectively, one of the distribution rates to the front wheels and the rear wheels is described in this case. When the acceleration is inputted to an arithmetic unit 62, the distribution rate is read out from the torque distribution table 61, and target torque is multiplied by the distribution rate to determine target torque to the front wheels or the rear wheels. By subtracting the target torque to the front wheels or the rear wheels from the overall target torque, target torque to the remaining driving wheels can be obtained. In place of the table 61, using the target torque and the acceleration, the arithmetic unit 62 may calculate the target torque to each of the front wheels and rear wheels by a predetermined formula.

Figure 7:
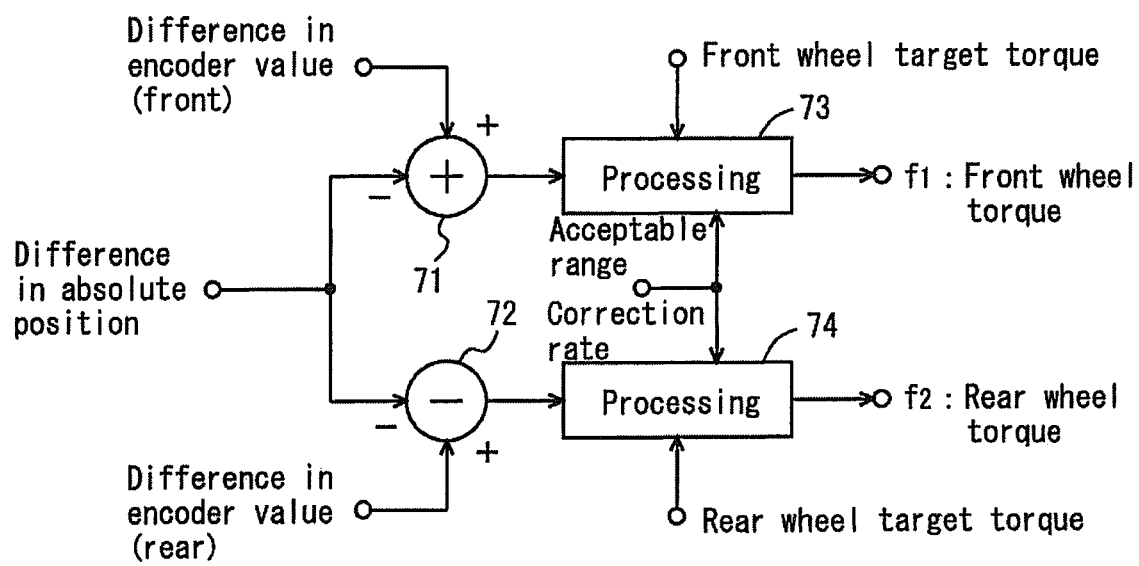
FIG. 7 is a block diagram of a slip detector in the embodiment.

FIG. 7 shows a configuration of the slip detector 23. Reference numerals 71 and 72 denote subtractors, in each of which a difference between a difference in encoder value per time and a difference in absolute position per time is found for each of the front and rear wheels. When there is no at all slip in the driving wheels, the difference in encoder value and the difference in absolute value should coincide with each other, and when the difference in encoder value is larger that the difference in absolute position, there occurs idling. On the contrary, when the difference in encoder value is smaller than the difference in absolute position, there occurs skid. In this case, the difference indicates an absolute value thereof with a positive sign. These differences are inputted to processors 73 and 74, the front wheel target torque and the rear wheel target torque are corrected in accordance with whether or not the difference between the difference in encoder value and the difference in absolute position is within an acceptable range, and supplementary parameters such as a correction rate to the torque when the difference exceeds the acceptable range, the running acceleration, and the velocity. In this manner, front wheel torque f1 and rear wheel torque f2 applied to the servomechanisms are obtained.

In the processing shown in FIG. 7, the slip is detected in the subtractors 71 and 72, and the feedback control is applied to the torque so as to eliminate the slip. The feedback control is applied to the front wheels and the rear wheels independently. The processors 73 and 74 perform control in accordance with the slip occurring per time, that is, the difference between the difference in encoder value and the difference in absolute position. Alternatively, an integrated value of these differences and time change of these differences may be added to these differences themselves.

Referring again to FIGS. 1 and 2, operation according to the embodiment is described. To the running vehicle 2 are inputted the absolute positions from the linear sensors 17 and 18 at short time intervals and the actual acceleration from the acceleration sensor 16. In place of the acceleration sensor 16, the acceleration may be found based on the sensor values of the linear sensors 17 and 18. Since the actual acceleration of the running vehicle 2 is found by the acceleration sensor 16, optimal torque to the front and rear driving wheels 8 and 9 can be determined in accordance with the acceleration. In this stage, the target is to run in accordance with a velocity pattern, and the torque required for such running is distributed to the front and rear driving wheels 8 and 9. As a result, the distribution rate of the torque is determined.

Next, using the differences between the encoder values of the encoders 10 and 11 and the absolute positions found in the linear sensors 17 and 18, the slip occurring per time is found. When the slip occurs, control is performed to decrease output torque from the running motors 6 and 7, and the acceptable range of the slip, the correction rate of the torque when the slip exceeding the acceptable range occurs, and the like are inputted or stored in advance as parameters in the processors 73, 74. The extent of the correction of the torque when the slip occurs may be changed in accordance with the acceleration and the velocity of the running vehicle 2. As described above, the output torque of the running motors 6 and 7 is subjected to feedback control so as to eliminate the slip.

The torque required for running in accordance with the velocity pattern is distributed to the front and rear driving wheels 8 and 9 in accordance with the acceleration to optimize the distribution of the torque. Next, the slip in each of the front and rear driving wheels 8 and 9 is detected to correct the torque, which can reduce delay from the velocity pattern and the like due to the slip. Particularly in a case where excessive target torque causes the slip in both of the front and rear driving wheels 8 and 9, reducing the driving torque to the respective driving wheels can prevent deviation from the velocity pattern.

The following effects can be obtained in the embodiment.
(1) Actual acceleration during running can be measured by the acceleration sensor to optimize the torque distribution.
(2) Since the torque is corrected when slip occurs in the driving wheel, running closest to the velocity pattern as a target is enabled within a range where no slip occurs.
(3) Since the torque distribution rate is not changed but the torque is corrected against the slip, a case where slip occurs in both of the front and rear driving wheels can be addressed.

(4) Since the absolute position is detected by the linear sensors, the absolute position can be detected precisely and continuously in a short time.

What is claimed is:

1. A running vehicle having front and rear driving wheels, and adapted to change torque distribution to the front and rear driving wheels in accordance with acceleration, the running vehicle comprising:
   a sensor for measuring the acceleration of the running vehicle;
   means for determining a distribution rate of torque to each of the front and rear driving wheels in accordance with the found acceleration;
   means for changing driving torque to each of the front and rear driving wheels based on the found distribution rate to control driving motors driving the front and rear driving wheels;
   means for detecting an absolute position of the running vehicle;
   means for detecting a rotation amount of each of the front and rear driving wheels;
   means for comparing a change in the absolute position per time and the rotation amount per time of each of the front and rear driving wheels to find presence or absence of a slip for each of the front and rear driving wheels; and
   means for correcting the found driving torque so as to eliminate the slip.

2. A running vehicle system comprising:
   a running vehicle having front and rear driving wheels; and
   marks arranged at intervals in at least two rows along a moving pathway of the running vehicle,
   the running vehicle including:
      a sensor for measuring acceleration of the running vehicle;
      means for determining a distribution rate of torque to each of the front and rear driving wheels in accordance with the found acceleration;
      means for changing driving torque to each of the front and rear driving wheels based on the found distribution rate;
      at least two linear sensors for detecting the marks in at least two rows;
      means for detecting an absolute position of the running vehicle from signals of the at least two linear sensors;
      means for detecting a rotation amount of each of the front and rear driving wheels;
      means for comparing change in the absolute position per time and the rotation amount per time of each of the front and rear driving wheels to find presence or absence of a slip for each of the front and rear driving wheels; and
      means for correcting the found driving torque so as to eliminate the slip.

3. A method for driving a running vehicle having front and rear driving wheels, the method comprising the steps of:
   measuring acceleration of the running vehicle by a sensor;
   determining a distribution rate of torque to each of the front and rear driving wheels in accordance with the found acceleration;
   changing driving torque to each of the front and rear driving wheels based on the found distribution rate to control driving motors driving the front and rear driving wheels;
   detecting an absolute position of the running vehicle;
   detecting a rotation amount of each of the front and rear driving wheels;
   comparing a change in the absolute position per time and the rotation amount per time of each of the front and rear driving wheels to find presence or absence of a slip for each of the front and rear driving wheels; and
   correcting the found driving torque so as to eliminate the slip.

* * * * *